US007069261B2

(12) United States Patent
Ahl et al.

(10) Patent No.: US 7,069,261 B2
(45) Date of Patent: Jun. 27, 2006

(54) SYSTEM, METHOD AND COMPUTER PROGRAM PRODUCT FOR ACCESSING ELECTRONIC INFORMATION

(75) Inventors: William J. Ahl, Seattle, WA (US); Roger L. Guay, Redmond, WA (US); David A. Okrent, Seattle, WA (US); Stephen P. Miller, Auburn, WA (US); Joseph F. Floyd, University Place, WA (US); Binoy V. Varughese, Kent, WA (US)

(73) Assignee: The Boeing Company, Seattle, WA (US)

( * ) Notice: Subject to any disclaimer, the term of this patent is extended or adjusted under 35 U.S.C. 154(b) by 634 days.

(21) Appl. No.: 10/114,355

(22) Filed: Apr. 2, 2002

(65) Prior Publication Data

US 2003/0187823 A1 Oct. 2, 2003

(51) Int. Cl.
*G06F 17/30* (2006.01)
(52) U.S. Cl. .................. 707/1; 707/5; 707/10; 709/201
(58) Field of Classification Search ...................... None
See application file for complete search history.

(56) References Cited

U.S. PATENT DOCUMENTS

| 5,506,937 A | 4/1996 | Ford et al. |
| 5,526,520 A * | 6/1996 | Krause .................... 707/104.1 |
| 5,857,199 A | 1/1999 | Tamano et al. |
| 5,907,850 A | 5/1999 | Krause et al. |
| 6,032,157 A | 2/2000 | Tamano et al. |

(Continued)

OTHER PUBLICATIONS

Junji Nomura, *Virtual Reality Technologies and its Applications to Industrial Use* (1995) <http://www.dea.polimi.it/dea/news/events/vp95/proc/nomura.htm>, 19 pages.

(Continued)

*Primary Examiner*—Sam Rimell
*Assistant Examiner*—Mellissa M. Chojnacki
(74) *Attorney, Agent, or Firm*—Alston & Bird LLP

(57) ABSTRACT

A system for accessing electronic information includes at least one electronic database, a graphical user interface (GUI) and a processing element. The electronic databases can store electronic information, at least a portion of which is contained within a collection of electronic documents. The GUI can display at least one electronic portal document comprising a plurality of graphical elements, at least one of which is associated with at least one pointer that is associated with and identifies at least a portion of the electronic information. The processing element, is responsive to a selection of at least one graphical element and thereafter a selection of at least one associated pointer to thereby select at least a portion of the electronic information. The processing element can locate, retrieve and access selected electronic information based upon the selected pointer and, as applicable, further based upon the predetermined indexing pattern of the respective collection.

35 Claims, 13 Drawing Sheets

U.S. PATENT DOCUMENTS

| | | | |
|---|---|---|---|
| 6,058,417 | A | 5/2000 | Hess et al. |
| 6,144,956 | A | 11/2000 | Yajima et al. |
| 6,178,432 | B1 | 1/2001 | Cook et al. |
| 6,256,032 | B1 | 7/2001 | Hugh |
| 6,289,361 | B1 | 9/2001 | Uchida |
| 2002/0111720 | A1* | 8/2002 | Holst et al. .................... 701/3 |
| 2003/0055812 | A1* | 3/2003 | Williams et al. ............... 707/1 |

OTHER PUBLICATIONS

Alberto J. Canas, et al., *El-Tech: A Performance Support System with Embedded Training for Electronics Technicians* (May 1997) <http://www.coginst.uwf.edu/~acanas/Publications/ElTech/El-Tech%20Flairs%2098.htm>, 7 pages.

*Interactive F16—Avitop.com* (visited May 29, 2001) <http://avitop.com/interact/default.htm>, 1 page.

*Skeletal System (Front View)* (visited May 29, 2001) <http://www.innerbody.com/image/skelfov.html>, 2 pages.

*Cooper Fitness Center—Interactive Body Diagram* (visited May 30, 2001) <http://www.cooperfitness.com/content/Fitness/StrenghtTraining/BodyDiagram.asp>, 1 page.

Joseph D. Novak, *The Theory Underlying Concept Maps and How to Construct Them* (visited Aug. 7, 2001) <http://cmap.coginst.uwf.edu/info/printer.html>, 11 pages.

* cited by examiner

SYSTEM, METHOD AND COMPUTER PROGRAM PRODUCT FOR ACCESSING ELECTRONIC INFORMATION

FIELD OF THE INVENTION

The present invention relates to systems and methods for accessing electronic information and, more particularly, to systems and methods for accessing electronic information from at least one electronic portal document.

BACKGROUND OF THE INVENTION

In many large companies having large integrated systems, documentation can be spread over a large number of buildings and/or companies, organized according to a large number of different storage methods, and indexed according to a large number of indexing schemes. In this regard, when a searcher desires to search and gather information regarding a specific subject, the searcher would typically be required to extensively search for the information, either manually or electronically.

The searcher would typically begin by locating the area of the company housing the information, which can be located in different buildings, such as between a sales office and maintenance building, for example. Once in the area of the information, the searcher would then be required to search through the various collections of documents in the area, such as manuals, according to the specific storage method of the area, such as alphabetically or according to a type of library indexing scheme. After finding the relevant collection, the searcher would be required to search for specific documents related to the desired subject according to the indexing scheme of the specific collection, such as according to the organization of the table of contents, index, etc., to locate the specific information desired. In the case of electronic searching, the searcher must often locate information through one or more databases or electronic documents using differing sets of interfaces, search schema and hyperlinking criteria.

Many times, the resources required to search for relevant information outpace the actual use of the information. As such, conventional searching can be time consuming, inefficient and costly for a company. Therefore, it would be desirable to design a system for accessing information that efficiently and inexpensively allows a searcher to locate relevant information without expending unnecessarily large amount of time.

SUMMARY OF THE INVENTION

In light of the foregoing background, the present invention provides a system, method and computer program product for accessing information in electronic form. The system, method and computer program product of the present invention allow one to access electronic information efficiently, inexpensively and without expending an unnecessarily large amount of time. In this regard, the system, method and computer program product of the present invention allow a searcher to search for information on a specific subject irrespective of the area, storage method or indexing scheme of the information.

Additionally, the system, method and computer program product of the present invention provide a technical information portal that integrates multiple databases and links multiple computer applications, including electronic training applications, as well as electronic documents, including text, graphical and multimedia documents. Advantageously, the technical information portal can use a navigational technique centered around a functional interactive diagram or series of diagrams of a system. In this regard, the system diagram(s) can be based on paper schematics and models of the system, which engineers and maintenance workers typically use to describe the system. As such, the system diagram(s) can describe a piece of instrumentation, machinery or combination of both, such as in the case of an aircraft, train, computerized milling machine or refinery.

According to one embodiment, the present invention provides a system for accessing electronic information, where at least a portion of the electronic information is contained within at least one collection of electronic documents indexed according to at least one predetermined indexing pattern. The system includes at least one electronic database, a graphical user interface (GUI) and a processing element. The electronic databases are capable of storing the electronic information, where electronic information that is the contained within a respective collection of electronic documents is stored according to the predetermined indexing pattern of the respective collection.

The GUI displays at least one electronic portal document, such as a schematic diagram of an operational system, comprising a plurality of graphical elements, such as operational elements of the operational system. In one embodiment, at least one of the portal documents that is displayed by the GUI further includes at least one simulation element. At least one of the graphical elements is associated with at least one pointer that is associated with and identifies at least a portion of the electronic information. In another embodiment, at least one of the graphical elements is associated with at least one displayable element electronic document that includes the pointers. And in yet another embodiment, at least one of the graphical elements comprises at least one model graphical element. Each pointer that is associated with electronic information that is contained within a respective collection of electronic documents identifies the electronic information according to the predetermined indexing pattern of the respective collection.

The system further includes a processing element responsive to a selection of at least one graphical element to thereby access and display at least one associated pointer. The processing element is further responsive to a selection of at least one associated pointer to thereby select at least a portion of the electronic information. The processing element is capable of locating the selected portion of electronic information based upon the selected pointer and, for the selected electronic information contained within a respective collection, further based upon the predetermined indexing pattern of the respective collection. In embodiments including the element electronic pages, the processing element is responsive to a selection of a graphical element to thereby access and display an associated element electronic document including the pointers. The processing element is further capable of retrieving the selected electronic information to thereby access the selected electronic information.

In embodiments including the model graphical element, the processing element is responsive to a selection of the model graphical element to thereby select at least a portion of the electronic information. In these embodiments, the processing element is further capable of modifying at least one graphical element of the portal document displayed by the GUI based upon the portion of electronic information that is selected, retrieved and accessed.

In embodiments including the simulation element, at least a portion of the electronic information is associated with at least one simulation document including at least one simulation graphical element associated with at least one graphical element on the portal document displayed by the GUI. In these embodiments, the processing element is responsive to a selection of the simulation element and thereafter a selection of at least one graphical element to further display an associated simulation document on the GUI. The processing element is further responsive to a selection of at least one simulation graphical element on the simulation documents that are displayed. From the selection of the simulation graphical elements, the processing element is capable of modifying at least one graphical element on the portal document based upon the simulation graphical elements that are selected. For example, the processing element can modify the graphical elements to thereby simulate an operation of at least one of the operational elements based upon the at least one simulation graphical element that is selected.

In another embodiment, the processing element is located at a first location. In this embodiment, the processing element is capable of retrieving the selected at least one electronic document via a wide area network (WAN) when the databases are located remote from the first location.

In operation, a method of accessing the electronic information begins by selecting at least one electronic portal document and thereafter selecting at least one graphical element and at least one associated pointer on the selected portal document to thereby select at least a portion of the electronic information. In embodiments wherein at least one of the graphical elements is associated with at least one element electronic document that includes the pointers, the graphical elements are selected to thereby access an associated element electronic document from which at least one associated pointer can be selected. After selecting at least one associated pointer, the processing element locates the selected portion of electronic information based upon the selected pointers and, for the electronic information contained within a respective collection, further based upon the predetermined indexing pattern of the respective collection. The processing element then retrieves the selected portion of electronic information to thereby access the selected portion of electronic information.

In embodiments where the graphical elements include at least one model graphical element, after a model graphical element has been selected and the selected portion of electronic information has been accessed, the processing element modifies at least one graphical element on the portal document based upon the selected portion of electronic information. In further embodiments where the portal document includes at least one simulation element, a respective simulation element is selected before selecting at least one graphical element. In these embodiments, after the simulation element and graphical element have been selected, the GUI displays at least one simulation document, including simulation graphical elements, associated with the selected portion of electronic information. At least one of the simulation graphical elements is then selected, and thereafter the processing element modifies the graphical elements on the portal document based on the simulation graphical element selected.

In a further embodiment, the portal documents comprise a schematic diagram of an operational system including a plurality of graphical elements representing operational elements of the system, and the simulation documents represent at least one control subsystem of the operational system and include at least one simulation graphical element associated with at least one graphical element of the selected portal document. In this embodiment, the processing element modifies the graphical elements on the portal document to thereby simulate an operation of at least one of the operational elements of the system based upon the simulation graphical elements that are selected.

In another embodiment, at least one portal document is selected from a first location. In this embodiment, the processing element retrieves the selected electronic documents via a wide area network (WAN) when the selected electronic documents are located remote from the first location. In addition to a system and method for accessing electronic information, the present invention also provides a computer program product for accessing electronic information.

Thus, utilizing the portal documents and pointers, the present invention provides an efficient, inexpensive and time saving system, method and computer program product for accessing electronic information in electronic form. By locating electronic information contained within a collection directly according to its respective indexing pattern, the system, method and computer program product allow one to search for information on a specific subject irrespective of the area, storage method or indexing scheme of the information.

BRIEF DESCRIPTION OF THE DRAWINGS

Figure 1:
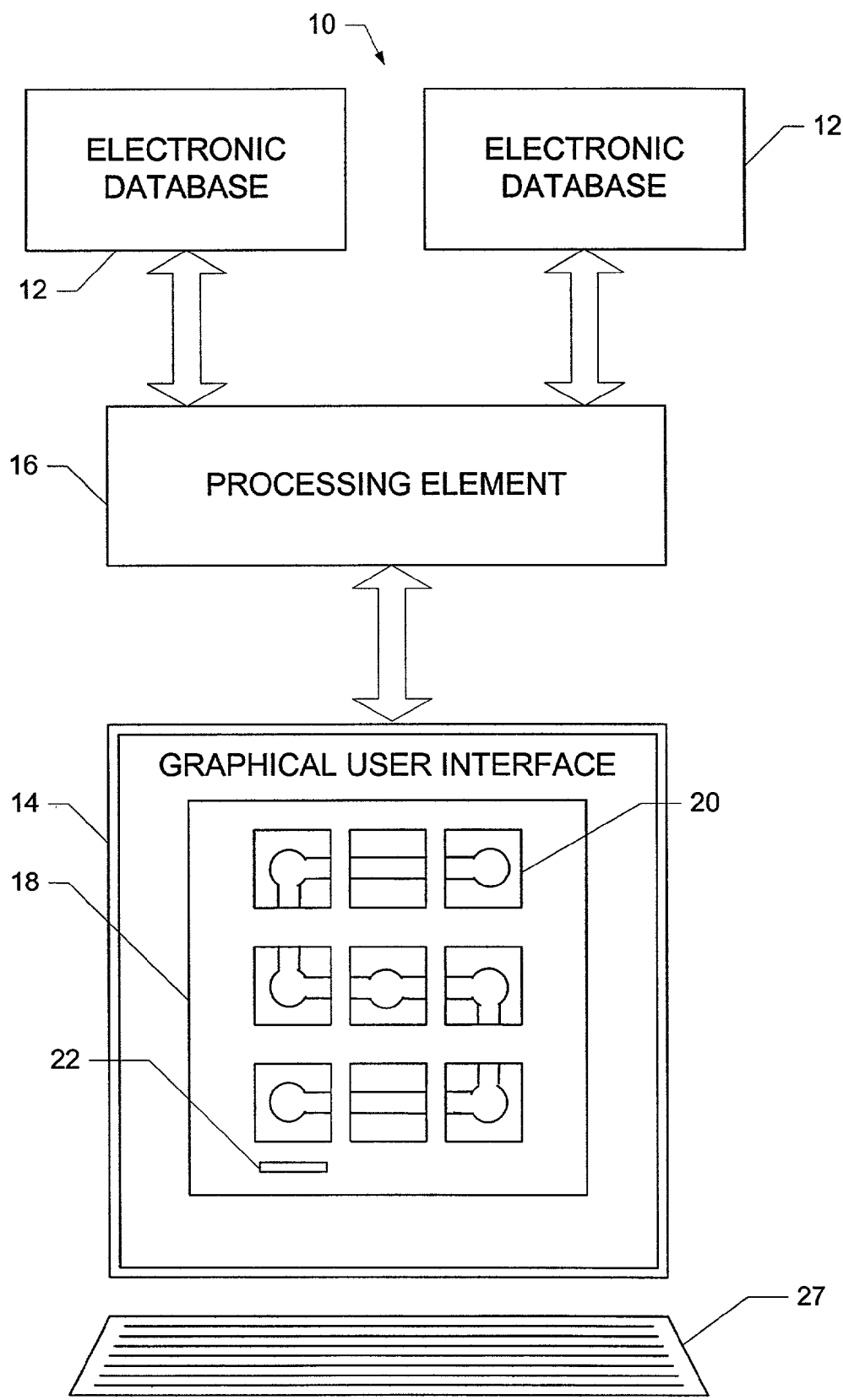
Figure 2A:
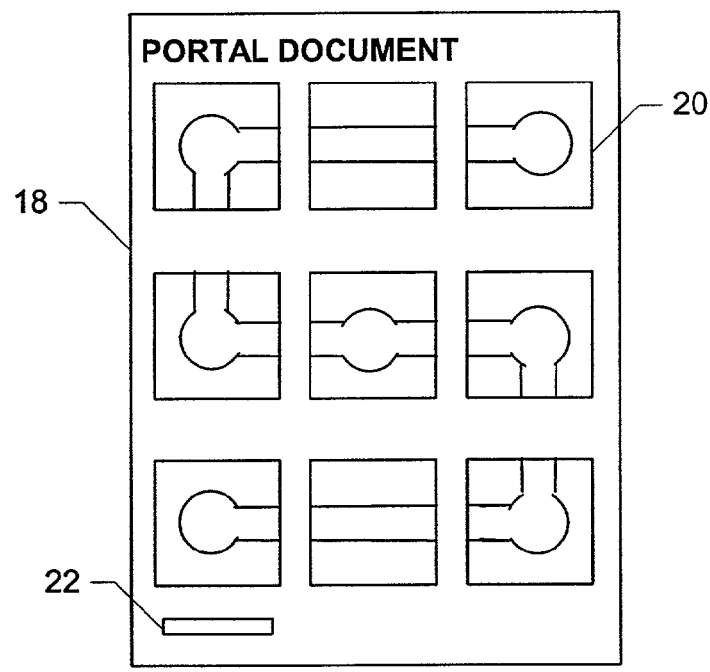
Figure 2B:
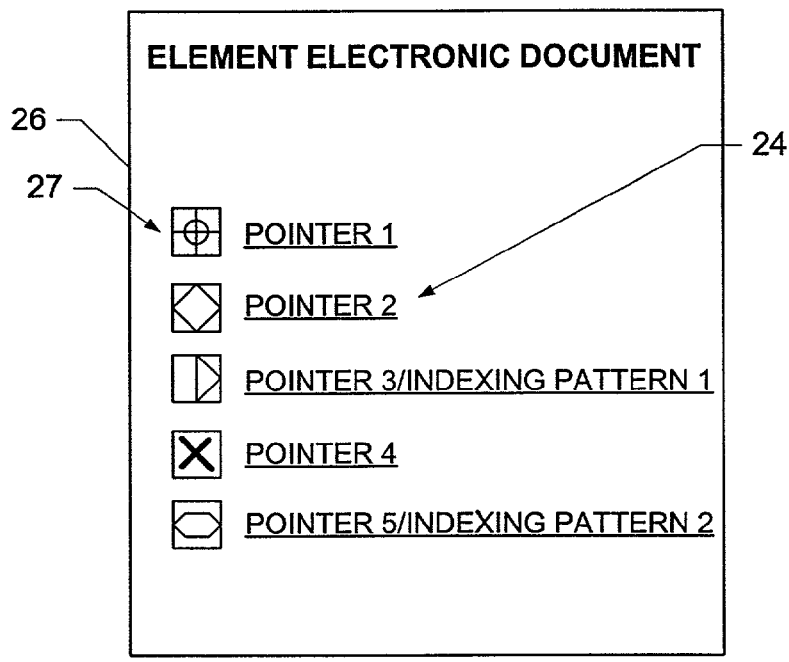
Figure 3:
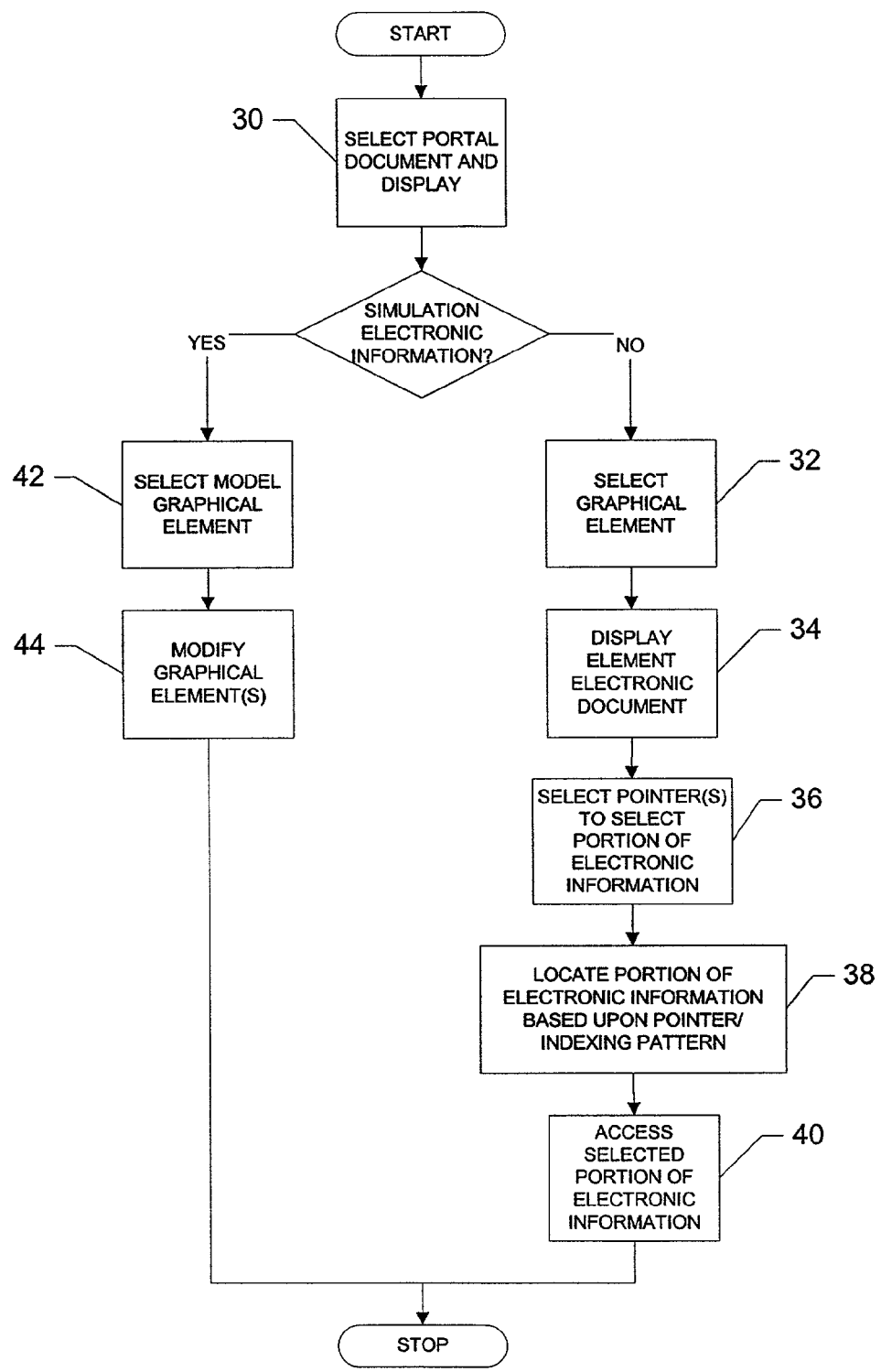
Figure 4:
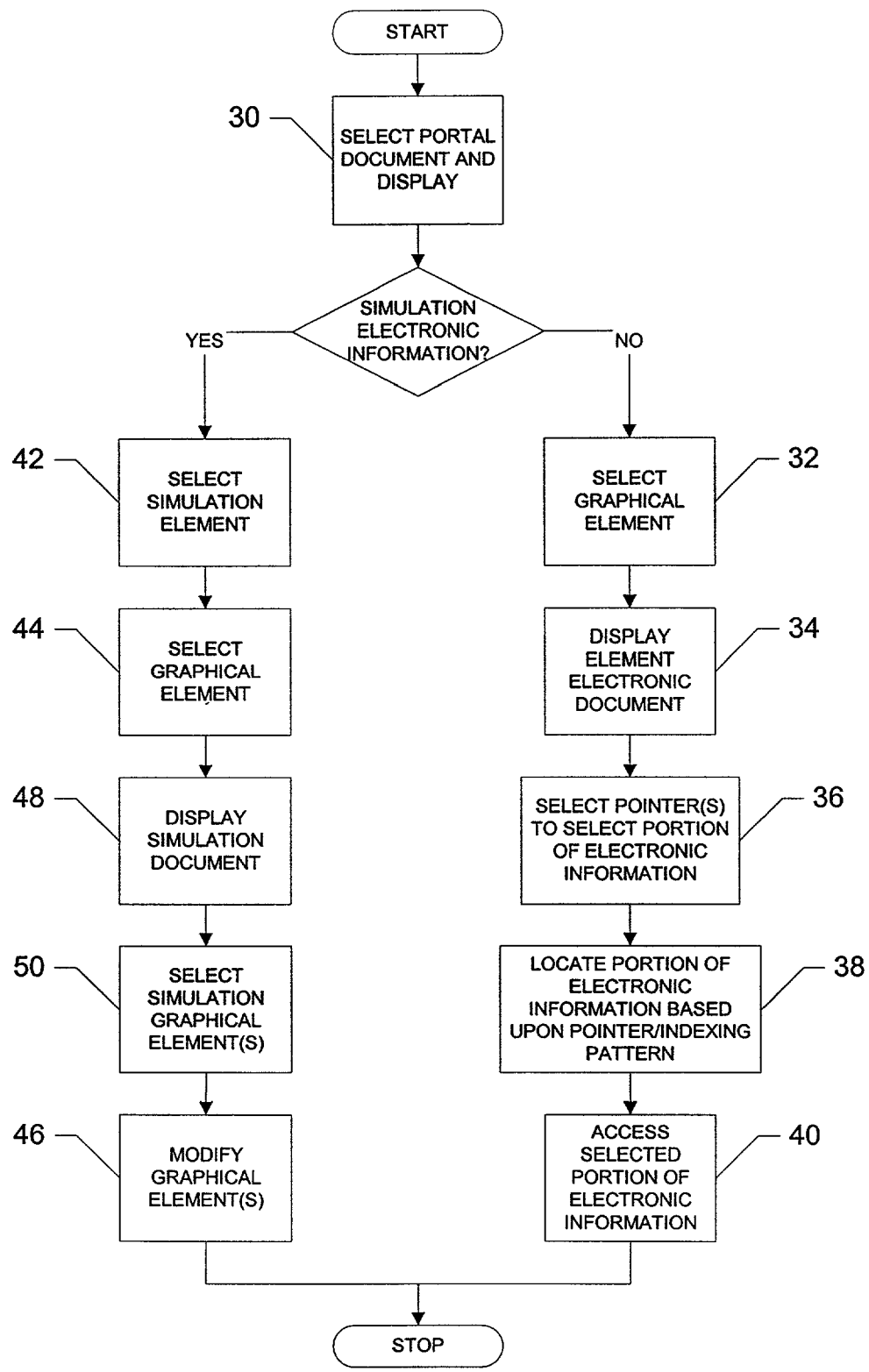
Figure 5A:
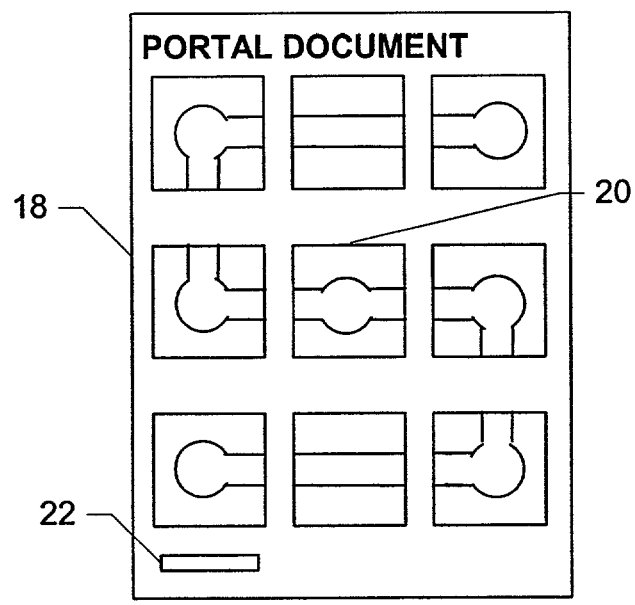
Figure 5B:
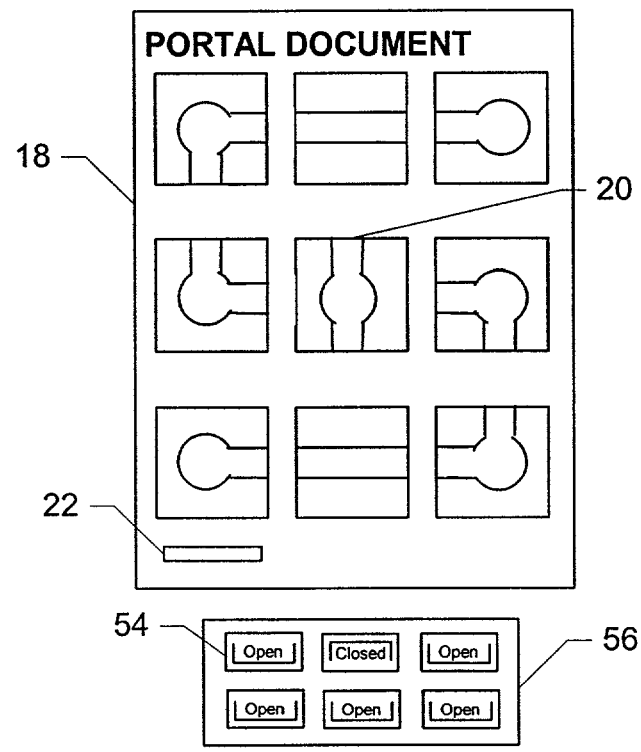
Figure 6:
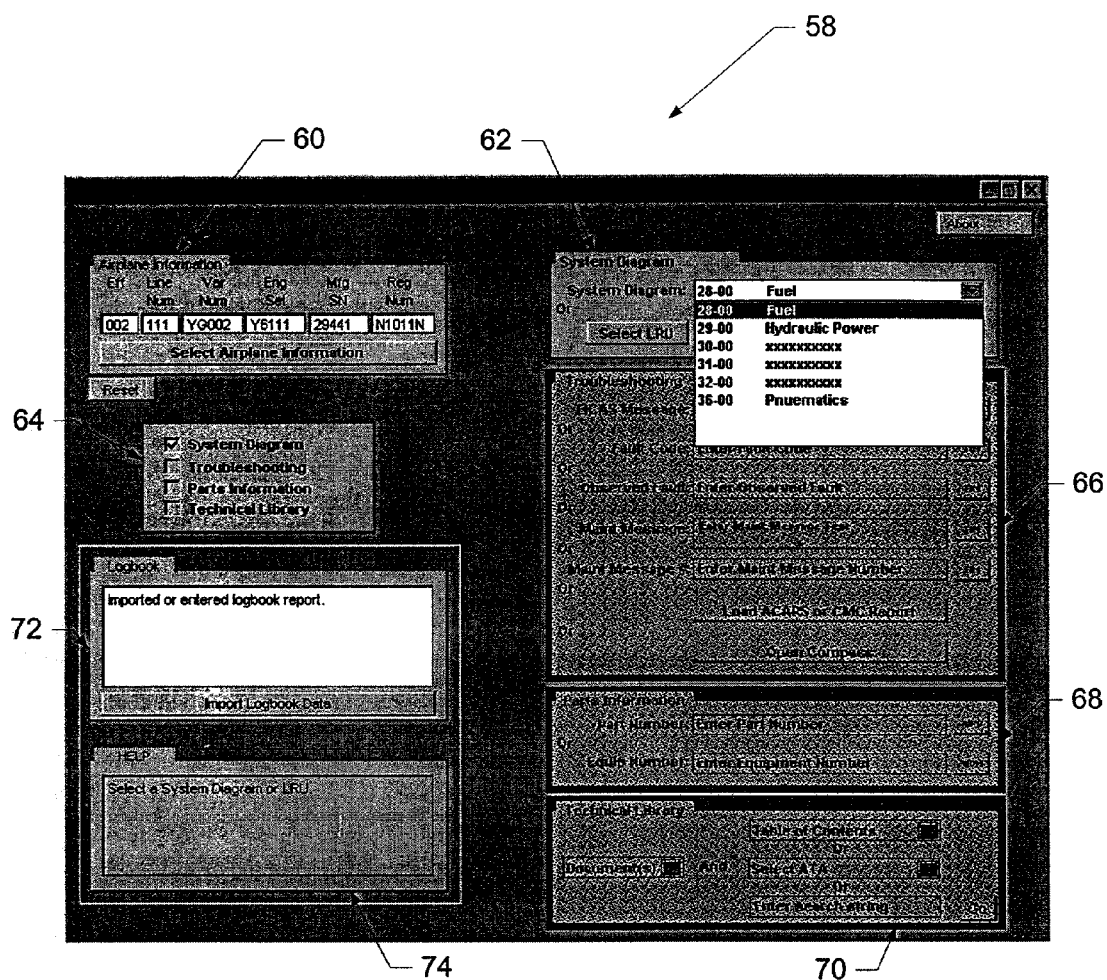
Figure 7:
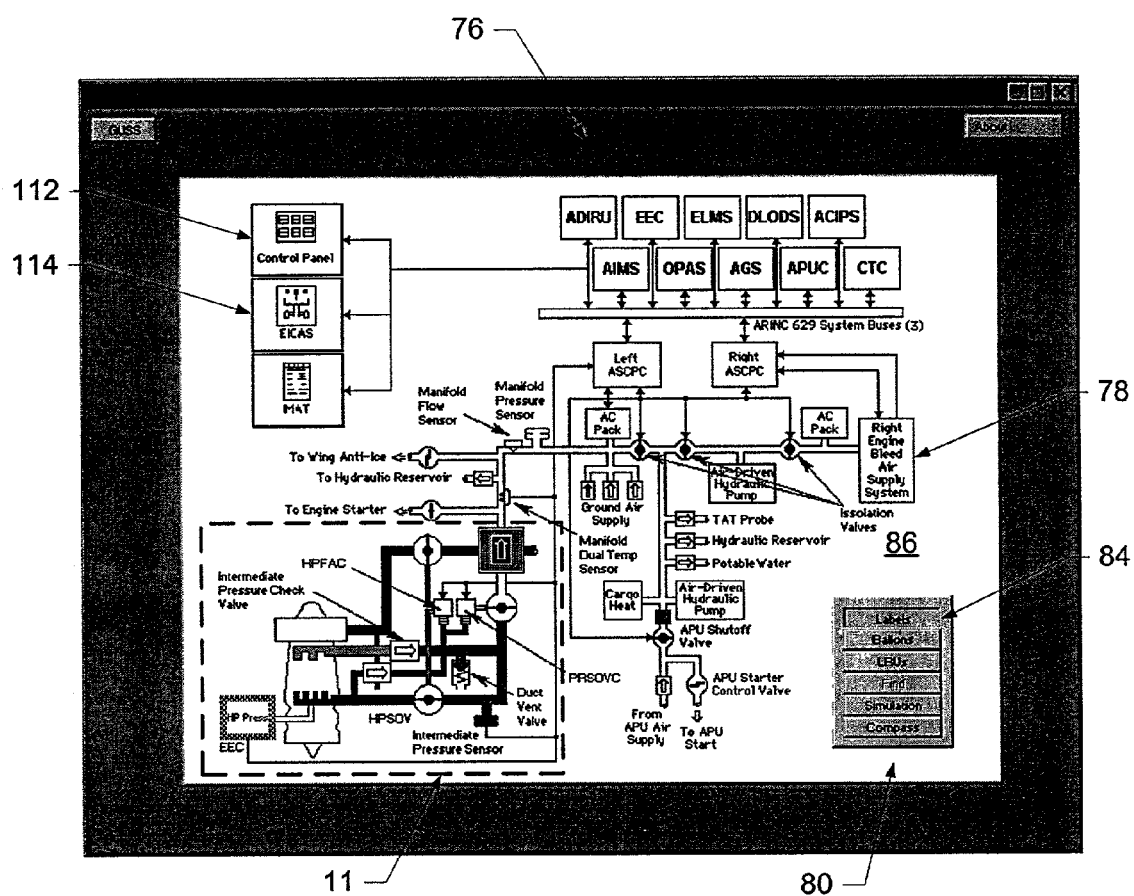
Figure 8:
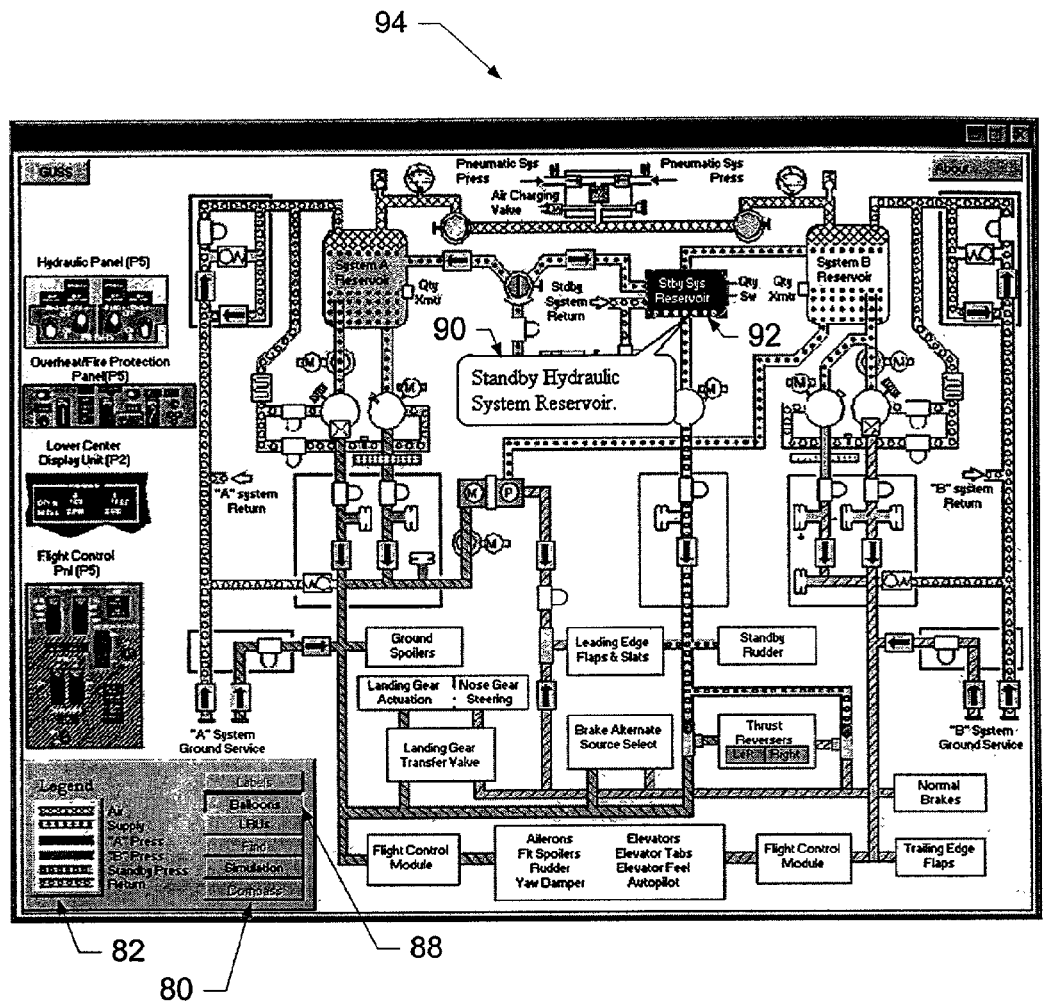
Figure 9:
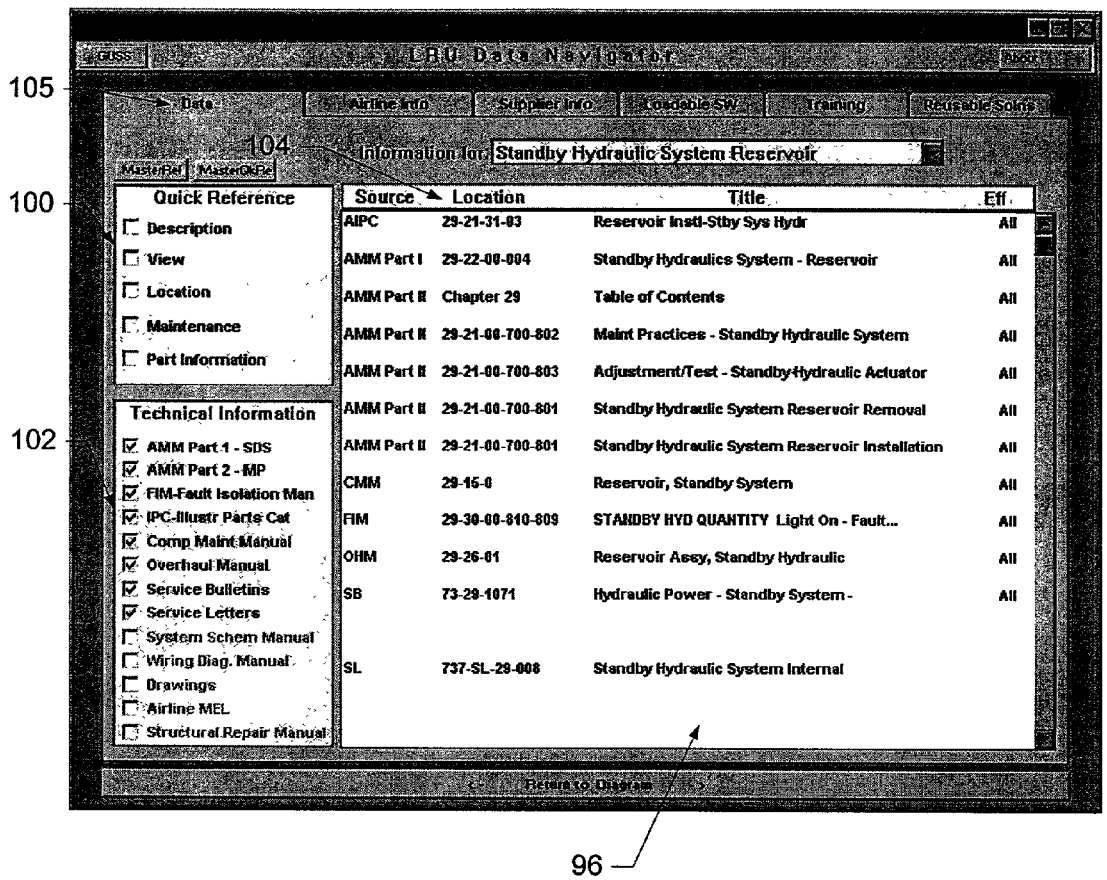
Figure 10:
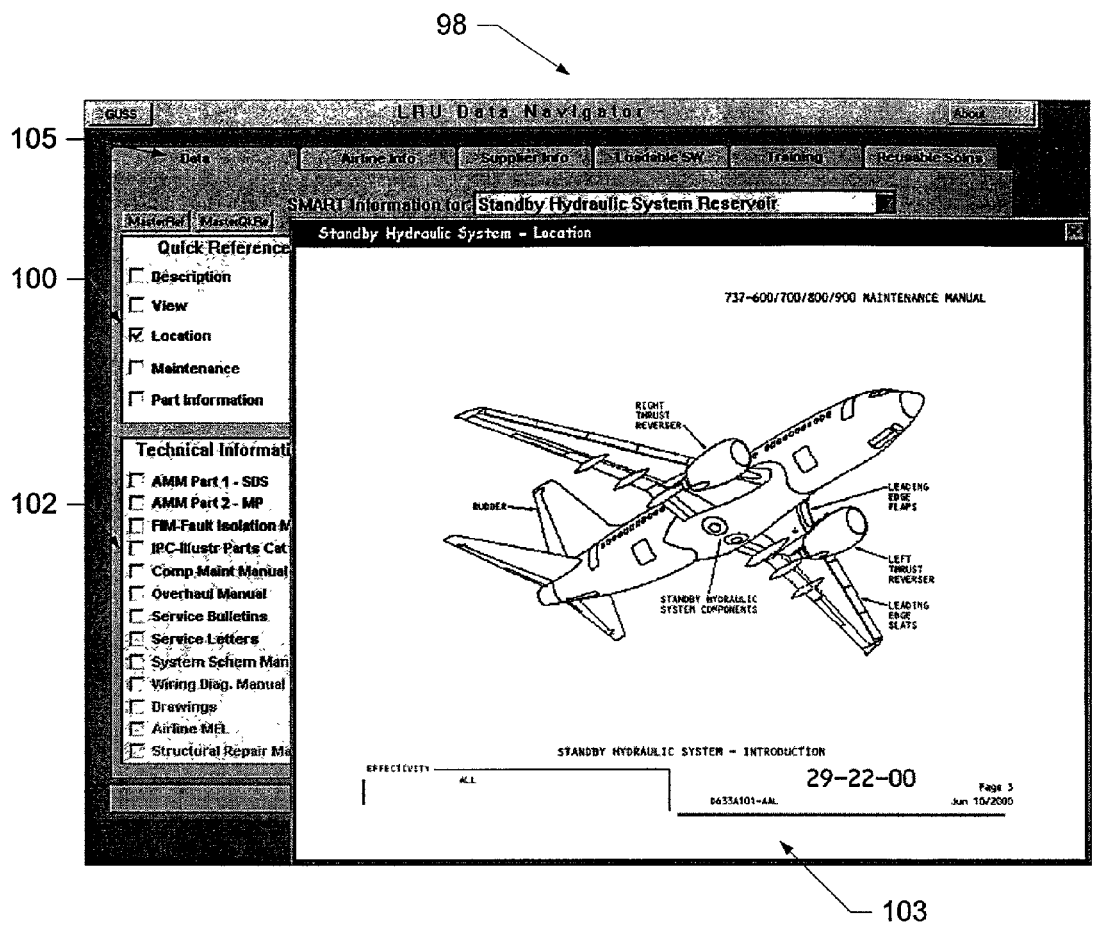
Figure 11A:
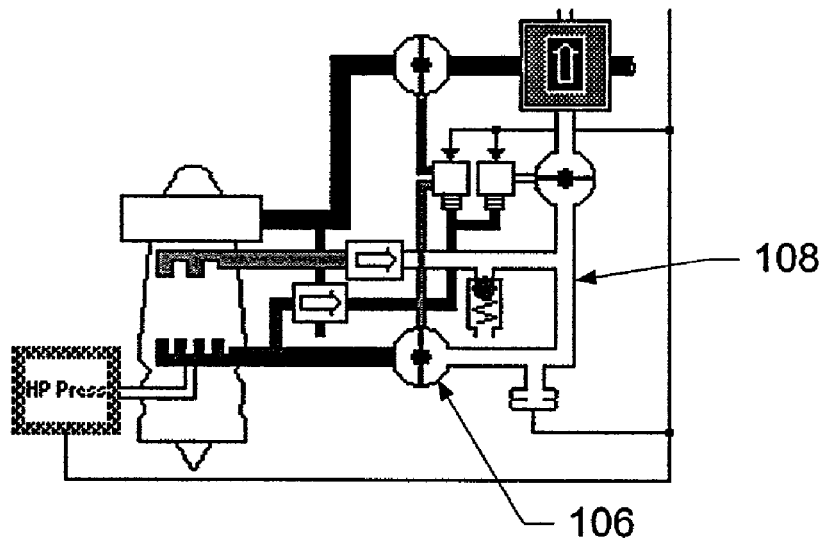
Figure 11B:
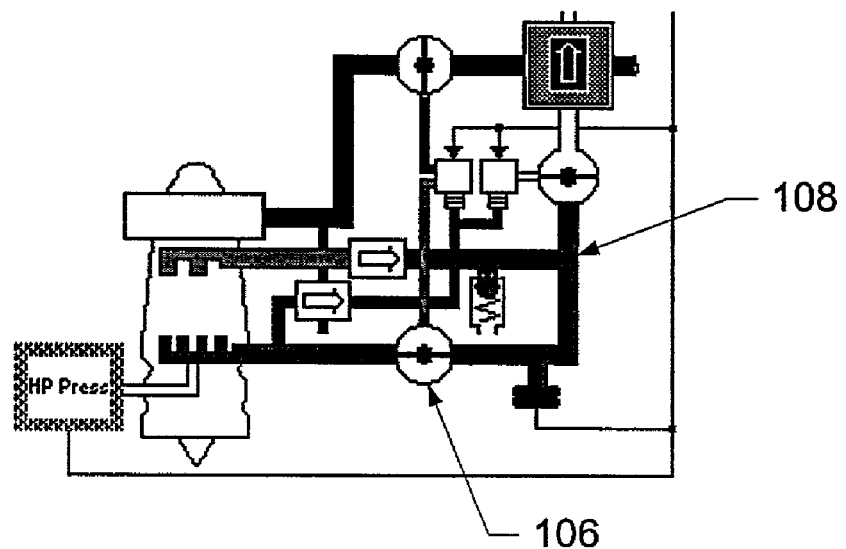
Figure 12A:
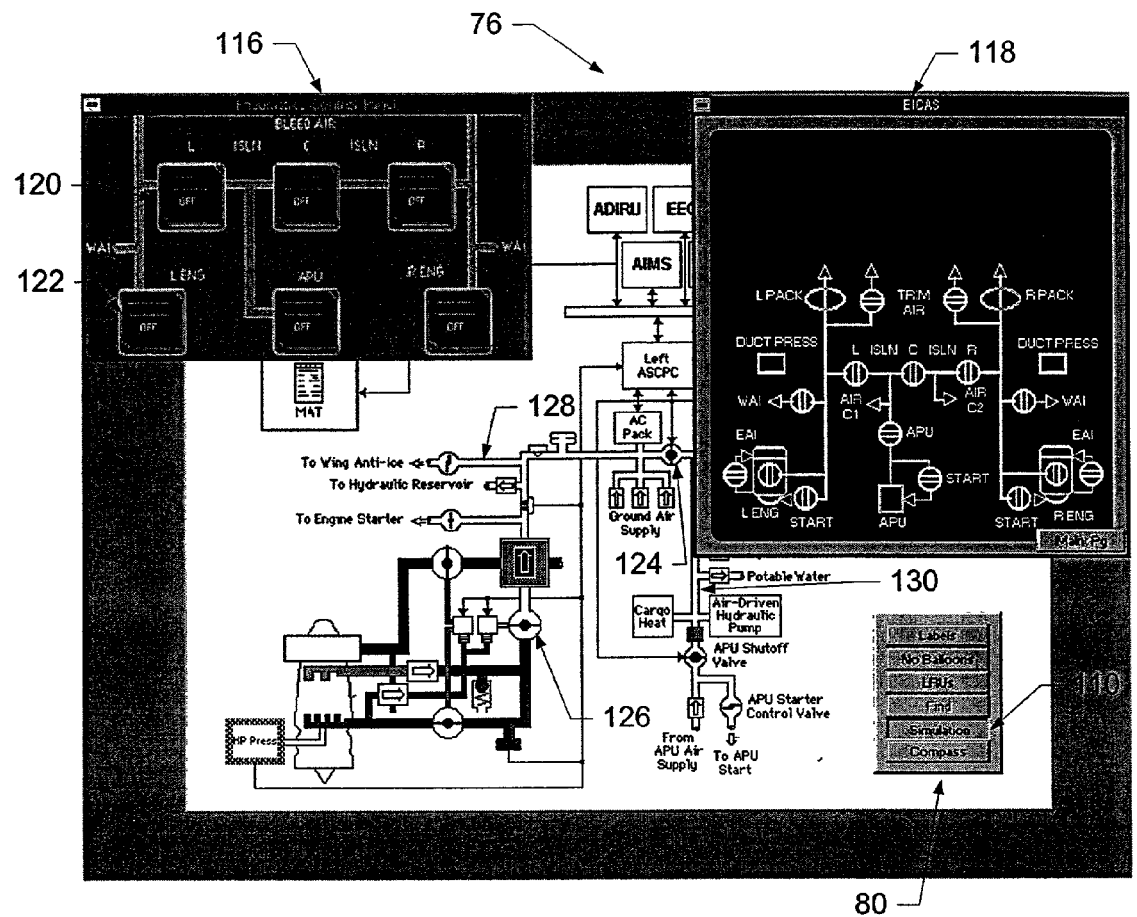
Figure 12B:
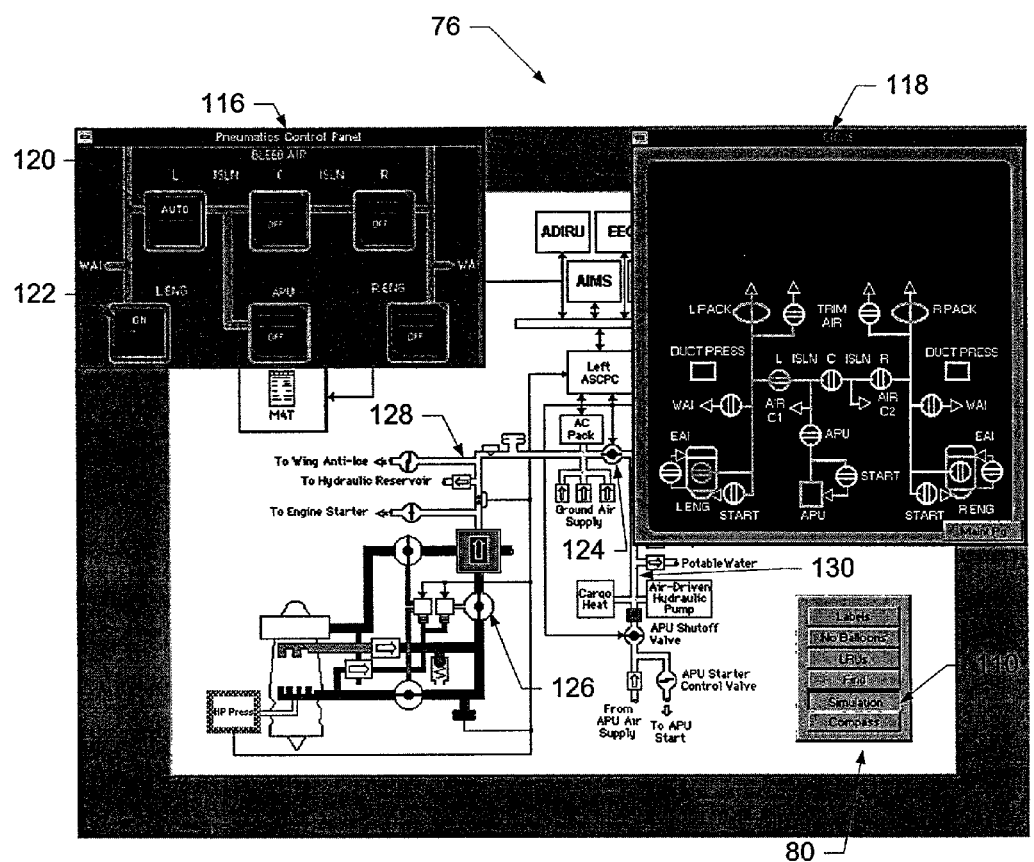

Having thus described the invention in general terms, reference will now be made to the accompanying drawings, which are not necessarily drawn to scale, and wherein:

FIG. 1 is a block diagram illustrating the elements of a system for accessing electronic information according to one embodiment of the present invention;

FIGS. 2A and 2B are schematic diagrams illustrating various displays of the graphical user interface (GUI) according to one embodiment;

FIG. 3 is a flow diagram illustrating various steps in performing a method for accessing electronic information according to one embodiment;

FIG. 4 is a flow diagram of another embodiment illustrating various steps in performing the method for accessing electronic information;

FIGS. 5A and 5B are schematic diagrams illustrating effects on at least one portal document by performing the method for accessing electronic information according to one embodiment of the present invention;

FIG. 6 is a schematic diagram depicting one example of an initial selection display of an aircraft maintenance aid utilizing one embodiment of the present invention;

FIG. 7 is a schematic diagram illustrating one example of a system diagram of a pneumatics system of a 777 model aircraft of the aircraft maintenance aid utilizing one embodiment of the present invention;

FIG. 8 is a schematic diagram of one example of a system display of an aircraft hydraulic power system of the aircraft maintenance aid utilizing one embodiment of the present invention;

FIG. 9 is a schematic diagram showing an example of an LRU data navigator display of the aircraft maintenance aid utilizing one embodiment of the present invention;

FIG. 10 is a schematic diagram of the LRU data navigator display of FIG. 9 including an overlying window of accessed electronic information comprising a scanned image;

FIGS. 11A and 11B are exploded schematic diagrams of a portion of the pneumatics system of a 777 model aircraft of FIG. 7 taken from box 11; and FIGS. 12A and 12B are schematic diagrams of the pneumatics system of a 777 model aircraft of FIG. 7 including overlying windows comprising operational control displays for simulating operations of various LRUs of the system diagram.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring to FIG. 1, the system 10 of the present invention provides a means to easily and quickly access electronic information from different locations. In this regard, the electronic information can comprise any of a number of different types of information, including information from text documents, graphical documents such as computer generated and computer scanned documents originating from a paper source, and multimedia documents such as video clips or simulation information respecting an operational system. The electronic information can also include fragments of information from such documents, such as individual sentences, words, pages, and portions of multimedia documents. Also, at least a portion of the electronic information is contained within at least one collection of electronic documents indexed according to at least one predetermined indexing pattern. For example, a scanned graphical document can be included within a collection of other scanned graphical documents from the same originating paper source and indexed according to the indexing pattern of the originating paper source.

According to one embodiment, the system 10 includes at least one electronic database 12, a graphical user interface (GUI) 14 and a processing element 16. The electronic databases store electronic information and can comprise any of a number of different electronic databases as such are known to those skilled in the art. As shown in FIGS. 1 and 2A, the GUI displays at least one electronic portal document 18, each of which includes a plurality of graphical elements 20 and, in a preferred embodiment, a simulation element 22. At least one of the graphical elements is associated with a portion of the electronic information such that a user accesses a desired portion of the electronic information based upon particular graphical elements, as described below.

The electronic portal document can comprise any of a number of electronic documents, such as an electronically displayable image of an operational system schematic diagram. Additionally, or alternatively, the electronic portal document can comprise a simulated three-dimensional "virtual" display of the operational system (not shown). For example, the electronic portal document can comprise a two-dimensional schematic diagram of an aircraft at any on of a number of different levels. The electronic portal document can also be displayed as a three-dimensional "virtual" display of the aircraft. The electronic portal document can be formatted in any one of a number of different formats, including hypertext markup language (HTML) or extensible markup language (XML) for two-dimensional displays, and virtual reality modeling language (VRML) for three-dimensional electronic portal documents.

While the graphical elements can depict a multitude of different identifiers, in a preferred embodiment the graphical elements collectively make up the operational system schematic diagram including interrelated operational elements of the operational system such as line replaceable units (LRUs). As such, the electronic portal document presents the user with a graphical model of the operational system.

To access a desired portion of electronic information, the graphical elements 20 are associated with at least one pointer that is associated with and identifies at least a portion of the electronic information. Based upon user selection of at least one pointer, the system can locate, retrieve and access the associated electronic information, as described below. For the electronic information that is contained within a respective collection of electronic documents, the respective pointers identify the electronic information according to the respective indexing pattern of the electronic information.

From the graphical elements 20, the pointers are presented on the GUI 14 to thereby select at least a portion of the electronic information associated with the respective pointers and, thus, graphical elements. The pointers can be presented according to any of a number of different methods, such as hypertext links presented in a displayable field that overlays the respective graphical element when the graphical element is selected (not shown). Additionally, or alternatively, the system can present the pointers 24 in at least one element electronic document 26 that is associated with the graphical elements associated with portions of the electronic information, as shown in FIG. 2B. The element electronic documents can comprise any of a number of different formatted documents, such as hypertext markup language (HTML) or extensible markup language (XML) formatted documents. Similarly, the pointers can comprise any of a number of different formatted elements, such as hypertext links identifying portions of the electronic information.

Additionally, or alternatively, as shown in FIG. 2B, the pointers presented by the element electronic documents can include graphical pointers 27. The graphical pointers are also associated with and identify at least a portion of respective electronic information. In this regard, the graphical pointers comprise an image associated with the respective electronic information. The graphical pointers can be interactive and comprise elements such as hyperlinks or, alternatively, the graphical pointers can merely comprise images that accompany pointers 24. In this regard, the image can comprise an image that best represents the associated electronic image, such as a thumbnail image of at least a portion of the respective electronic information. As such, the user can more conveniently browse through the presented pointers and/or graphical pointers to select at least a portion of the information.

Referring again to FIG. 1, the system 10 further includes the processing element 16. The processing element can comprise any of a number of different devices, such as a personal computer or other high level processor. The processing element processes user selections from the GUI 14 and, based on those selections, displays various elements on the GUI, including the portal document and pointers. Additionally, based upon user selections, the processing element communicates with the electronic databases 12 to locate, retrieve and access portions of the electronic information. Additionally, based on user selections, the processing element can display further electronic information on the GUI and modify existing electronic information on the GUI, such as the portal document, as described below. As used herein unless specified otherwise, selections are generally made via an input device to the processing element, such as a keyboard 27, mouse (not shown) or the like.

Referring now to FIGS. 2A, 2B and 3, according to one embodiment, a method of accessing electronic information begins by selecting at least one electronic portal document 18 from the GUI 14. The portal document selected can be chosen according to any of a number of different methods, including a list of portal documents or a master portal document with graphical components representing each portal document, each displayed by the GUI. Regardless of the manner in which the portal document is selected, the GUI displays the selected the portal document after the selection is made. (Block 30). From the displayed portal document including the plurality of graphical elements 20, electronic information associated with at least one of the graphical elements can be accessed from the pointers. As such, unless accessing simulation electronic information respecting the graphical elements of the portal document, at least one graphical element is selected. (Block 32). Otherwise, if accessing simulation electronic information respecting the graphical elements, the simulation element is first selected, as described below.

Once at least one graphical element 20 is selected, the processing element 16 displays on the GUI 14 at least one pointer 24 associated with the selected graphical element, such as by displaying the element electronic document 26 including the pointers. (Block 34). From the pointers, a portion of the electronic information can be located, retrieved and accessed. In this regard, the pointers that identify the desired electronic information are selected from the element electronic document. (Block 36). From the selected pointers, the processing element locates the desired electronic information associated with the selected pointers in the electronic databases 12. Additionally, as stated, at least a portion of the electronic information is contained within at least one collection of electronic documents indexed according to at least one predetermined indexing pattern. Therefore, for the desired electronic information that is contained within a respective collection, the processing element further locates the desired electronic information according to the predetermined indexing pattern of the respective collection. (Block 38). Because the processing element can be located remote from the electronic databases, the processing element is capable of locating the desired electronic information from the electronic databases across a wide area network (WAN), such as the Internet.

As stated, for the electronic information that is contained within a respective collection and is associated with the selected pointers 24, the processing element 16 locates the desired electronic information further based upon the predetermined indexing pattern of the collection. The predetermined indexing pattern can comprise any of a number of different indexing patterns, such as hard coding the exact location of the electronic information within the collection into the respective pointer, or searching for the desired electronic information based upon the indexing pattern of the collection. For example, the predetermined indexing pattern of a particular collection can index the electronic information according to a number identifier unique to the particular topic of the electronic information. Another predetermined indexing pattern could index the electronic information alphabetically according to the topic. Based on the number of collections containing desired electronic information, the processing element is capable of locating desired electronic information on a given topic in multiple collections utilizing multiple different indexing patterns.

Still a further indexing pattern in the context of a schematic diagram of an aircraft could include a custom query built from the combination of the LRU name corresponding to the graphic element 20, the ATA (Air Transport Association) index classification assigned to the LRU, and the aircraft model information. The query would be run against meta data compiled from a collection of electronic documents returning a list of pointers, or hyperlinks, pertinent to the LRU.

Once the processing element 16 has located the desired electronic information, the processing element retrieves the desired electronic information from the electronic databases 12. Similar to locating the desired electronic information, if the electronic databases are located remote from the processing element, the processing element can retrieve the electronic information across a WAN. Once retrieved, the processing element can access the desired electronic information, such as by displaying a text document or graphical document, or executing a multimedia document. (Block 40).

Referring now to FIGS. 3, 5A and 5B, as stated above, in a preferred embodiment the portal documents 18 represent schematic diagrams of operational systems with the graphical elements 20 representing operational elements of the operational systems. As such, operational electronic information respecting the graphical elements of the portal document can be accessed and thereafter used by the processing element 16 to modify at least one of the graphical elements on the portal document to thereby simulate an operation of at least one of the operational elements of the operational systems.

To access the operational electronic information, at least one of the graphical elements 20 comprises a model graphical element, which is selected. (Block 42). Once the model graphical element has been selected, the processing element can retrieve the desired operational electronic information associated with the selected model graphical element to thereby access and utilize the desired operational electronic information. From the operational electronic information, the processing element can modify at least one of the graphical elements to thereby simulate the operation. (Block 44). For example, the processing element 16 can modify a graphical element by rotating the display of one graphical element, as shown in FIG. 5B. Modifying the graphical elements allows the system to simulate an operation of the operational system.

Referring to FIG. 4, in addition to accessing the operational electronic information and modifying graphical elements 20 directly from a selection of the graphical elements, the portal documents 18 can include at least one simulation element 22. Additionally, the system can include an electronic simulation document 54, such as a control subsystem of the portal document operational system schematic diagram, which the GUI can display. (Block 48). The electronic simulation document is associated with operational electronic information and includes at least one simulation graphical element 56 associated with at least one graphical element on the portal document. After the GUI displays the electronic simulation document, at least one of the simulation graphical elements can then be selected. (Block 50). The processing element responds to the selection of the simulation graphical element by modifying the graphical elements on the portal document. Additionally, the processing element can modify the selected simulation graphical element, such as by modifying a graphical "open" switch to a graphical "closed switch," as shown.

Attention is now drawn to FIGS. 6–13, which illustrate example displays for the GUI implementing the present invention in the context of an aircraft maintenance aid. At this point it should be understood that FIGS. 6–13 are merely illustrative of one type of application and accompanying displays that would benefit from the present invention. In this regard, the present invention could be implemented in any one of a number of different contexts, without departing from the spirit and scope of the present invention.

Referring to FIG. 6, upon initiating the aircraft maintenance aid, an initial selection display 58 is displayed by the GUI. The initial selection display presents users with a starting point from which to select an operational system (i.e., portal document). The initial selection display includes an airplane information field 60, from which a user can select a specific aircraft. In this regard, the user can narrow the amount of available information to only that information relevant to a selected aircraft, which can be listed according to any of a number of different identifiers, such as effectivity ("Eff"), line number ("Line Num"), variable number ("Var Num") engine set ("Eng Set"), manufacturing serial number ("Mfg SN") and registration number ("Reg Num").

The initial selection display 58 further includes a system diagram selection field 62. The system diagram selection field contains a listing of the system diagrams (i.e., portal documents) available for the selected aircraft. A system diagram can be selected according to any of a number of different methods, including a drop-down menu of available system diagrams and/or by entering a specific line replaceable unit (represented by at least one graphical element on the system diagram).

In addition to providing system diagrams from which to select and access information, the aircraft maintenance aid provides other methods by which to select information. In this regard, the initial selection display 58 includes an arrangement field 64 that includes a list of available search methods of the aircraft maintenance aid. A desired search method can be selected according to any of a number of known methods, such as a checkbox selection as shown. According to the illustrated embodiment, the aircraft maintenance aid includes a troubleshooting information field 66, a parts information field 68 and a technical library selection field 70. As such, the user can search for desired information according to troubleshooting information or parts information, or through a technical library. In addition, the initial selection display can include any of a number of different fields for providing other information, including a logbook information field 72 and a help information field 74.

Referring to FIG. 7, from the initial selection display 58, a specific system diagram, such as a pneumatics system of a 777 model aircraft 76, can be selected and thereafter displayed by the GUI by selecting a specific aircraft from the airplane information field 60 and thereafter selecting the desired system diagram from the system diagram selection field 62. In the illustrated embodiment, the GUI then displays the system diagram of the selected pneumatics system. The system diagram is made up of a plurality of graphical elements representing operational elements of the illustrated system. Among the graphical elements, the system diagram includes a plurality of graphical line replaceable units (LRUs), such as a graphic block 78 representing the right engine bleed air supply system of the pneumatics system.

The system diagram provides a graphic display of interrelated operational elements, and provides a portal for a user to access information relevant to each LRU of the diagramed system. In this regard, the system diagram provides a graphical interface from which to navigate through a multitude of documents. The partitioning of information according to the system/operational element display enables users to access information rapidly because the users can quickly determine how the LRUs of a system are interconnected and associated with other aircraft systems.

In addition to the operational elements of the system diagram, the system diagram can include an options field 80. The system diagram can also include a legend field 82 (shown in FIG. 8). The options field generally includes elements that, when selected, affect the appearance of the display of the system diagram. For example, by selecting a labels element 84, the GUI displays text identifiers on the system diagram to label the LRUs not otherwise labeled, such as isolation valve labels 86 identifying the isolation valves of the pneumatics system. Also, by selecting a balloons element 88 and thereafter selecting a specific LRU, the GUI displays graphical balloons including text identifying the name and/or function of the selected LRU. For example, the GUI can display a balloon 90 adjacent the graphic block 92 representing the standby hydraulic system reservoir on a system diagram of an aircraft hydraulic power system diagram 94, shown in FIG. 8.

From the system diagram display, information respecting a specific LRU can be obtained by selecting the desired LRU, such as for the standby hydraulic system reservoir 92 of the aircraft hydraulic power system diagram 94. In this regard, at least one pointer, such as at least one hyperlink, is displayed upon selecting the specific LRU. The pointers are associated with the selected LRU, and are associated with and identify information relevant to the selected LRU. The pointers can be displayed in any of a number of different manners but, as illustrated in FIG. 9, the pointers 96 can be displayed on a separate LRU data navigator display 98 (i.e., element electronic display).

The LRU data navigator display 98 includes the pointers 96 which link to all information relevant to the selected LRU. The pointers can be organized by the information associated with the pointer according to any of a number of different methods, including by source, location, and/or title of the associated information. Because a particular LRU can be associated with a large amount of information and, thus, a large number of pointers, the LRU data navigator display can include a quick reference field 100 and a technical information source field 102. The quick reference field includes a list of frequently accessed information respecting the selected LRU. In the illustrated example, selecting location causes the processing element to locate, retrieve and access information consisting of a scanned image 103 of the standby hydraulic system reservoir taken from a print copy of the aircraft maintenance manual for the aircraft, as shown in FIG. 10. The scanned image can be presented in any one of a number of known ways, such as by displaying the scanned image in a display window overlying the LRU data navigator display.

The technical information source field 102 of the LRU data navigator display 98 presents a method whereby pointers 96 associated with the information relevant to the selected LRU can be displayed according to source of the information. In this regard, by selecting a particular source, such as the Component Maintenance Manual (CMM), the LRU data navigator display lists only those pointers associated with information in the CMM relevant to the selected LRU. In the illustrated embodiment, information regarding the standby hydraulic system reservoir is listed according to various sources, including the Aircraft Maintenance Manual (AMM), which is broken down into two parts, Part I including information from the Systems Descriptions Section (SDS) of the AMM, and Part II including information from the Maintenance Practices (MP) section of the AMM.

Additionally, information is included from the Fault Isolation Manual (FIM), Illustrated Parts Catalog (IPC), CMM, Overhaul Manual, Service Bulletins and Service Letters.

From the LRU data navigator display 98, a specific portion of information relevant to the selected LRU can be accessed by selecting the respective pointer from the list of pointers 96 (or by making a selection from the quick reference field as previously described). After selecting a pointer, the processing element locates the respective information in the electronic database storing the information based upon the selected pointer. Then, the processing element retrieves and accesses the information, such as by displaying the information on the GUI.

As illustrated by the location identifiers 104 of the pointers, at least some, if not all, of the information is included within a respective source (i.e., collection of documents) which can be indexed according to different indexing patterns. As such, the processing element can locate the selected information according to the indexing pattern of the respective source. For example, information in the AMM Part I is indexed according to a "chapter-section-subject-page number" scheme such that SDS is located in Chapter 29, Section 22, Subject 00 at page 4.

In addition to information the user can access from the quick reference field and technical information field, the LRU data navigator display 98 can provide other types of information, such as information relating to the selected LRU from other sources, such as from an airline, or a supplier. In addition, the LRU data navigator display can provide loadable software such as the onboard loadable software for the Cabin Pressure Controller on a Boeing Model 737 aircraft, as well as training information and reusable solutions information regarding the selected LRU. The LRU data navigator display can breakdown the type of LRU information according to any known method, such as via tabs 105 organized by information type.

In addition to information provided by the LRU data navigator display 98, the aircraft maintenance aid allows users to simulate functions of various LRUs of the system diagrams. In this regard, reference is now made to FIGS. 11A and 11B which illustrate a portion of the pneumatics system of the 777 model aircraft illustrated in FIG. 7. As illustrated, the system diagram includes a model graphical element representing a high pressure shutoff valve (HPSOV) 106. When the HPSOV of the pneumatics system of an aircraft is in the closed position, air does not flow past the HPSOV. Thus, as shown in FIG. 11A, when the model graphical element of the HPSOV is in the closed position, the air does not flow in duct 108. Selecting the graphical element of the HPSOV, however, rotates the position of the graphical element of the HPSOV, to place the HPSOV in the open position, as shown in FIG. 11B. When the position of the graphical representation of the HPSOV is rotated, air flows in the duct, as represented by shading of the duct.

Referring now to FIGS. 12A and 12B, in addition to simulating an operation of various LRUs by directly selecting the specific LRU, the aircraft maintenance aid can provide a simulation element 110. The simulation element allows the user to display various control panels (i.e., simulation documents) associated with the LRUs of a particular system diagram. In preferred embodiments, the control panels represent various control panels seen, such as in the cockpit, in an aircraft including the respective system depicted by the system diagram. By selecting the simulation element and thereafter selecting the graphical element representing the respective control panel, the processing element displays the respective control panel on the GUI. The control panels can be displayed in any of a number of different ways, such as in a separate window overlaying the system diagram, as shown. In the illustrated embodiment of FIG. 12, selecting the simulation element display and thereafter the block representing the control panel 112 and Engine Indication and Crew Alerting System (EICAS) 114, both illustrated on FIG. 7, the processing element displays the respective control panel 116 and EICAS 118 on the GUI.

Each control panel includes at least one simulation graphical element, such as operational controls, that is associated with at least one LRU on the system diagram. To simulate an operation of at least one of the LRUs, and the overall system, at least one of the operational controls is selected. For example, by selecting the operational controls for the left isolation switch 120 and the left engine pressure regulating shutoff valve (PRSOV) 122, the processing element can simulate the operation of the graphical elements on the system diagram for the respective isolation switch 124 and PRSOV 126, as shown in FIG. 12B. As the operation of the LRUs is simulated, other graphical elements on the system diagram respond to changes in the selected LRUs. For example, in the illustrated embodiment, by placing the isolation switch in auto mode and the PRSOV in the on mode, as shown by the respective operational controls on the control panel, when the respective LRUs are modified on the system diagram, the processing element modifies ducts 128 and 130 by shading the ducts to represent the flow of air in the ducts.

The present invention therefore provides an efficient, inexpensive and time saving system, method and computer program product for accessing electronic information in electronic form. By utilizing the portal documents and pointers, and by locating electronic information contained within a collection directly according to its respective indexing pattern, the present invention allows one to search for information on a specific subject irrespective of the area, storage method or indexing scheme of the information.

In various advantageous embodiments, portions of the system and method of the present invention include a computer program product. The computer program product includes a computer-readable storage medium, such as the non-volatile storage medium, and computer-readable program code portions, such as a series of computer instructions, embodied in the computer-readable storage medium. Typically, the computer program is stored and executed by a processing unit or a related memory device, such as the processing element 16 as depicted in FIG. 1.

In this regard, FIGS. 1–12 are block diagram, flowchart and control flow illustrations of methods, systems and program products according to the invention. It will be understood that each block or step of the block diagram, flowchart and control flow illustrations, and combinations of blocks in the block diagram, flowchart and control flow illustrations, can be implemented by computer program instructions. These computer program instructions may be loaded onto a computer or other programmable apparatus to produce a machine, such that the instructions which execute on the computer or other programmable apparatus create means for implementing the functions specified in the block diagram, flowchart or control flow block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the block diagram, flowchart or control flow block(s)

or step(s). The computer program instructions may also be loaded onto a computer or other programmable apparatus to cause a series of operational steps to be performed on the computer or other programmable apparatus to produce a computer implemented process such that the instructions which execute on the computer or other programmable apparatus provide steps for implementing the functions specified in the block diagram, flowchart or control flow block(s) or step(s).

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagram, flowchart or control flow illustrations, and combinations of blocks or steps in the block diagram, flowchart or control flow illustrations, can be implemented by special purpose hardware-based computer systems which perform the specified functions or steps, or combinations of special purpose hardware and computer instructions.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of accessing electronic information, wherein at least a portion of the electronic information is contained within at least one collection of electronic documents indexed according to at least one predetermined indexing pattern, said method comprising:
    selecting at least one electronic portal document comprising a plurality of graphical elements, wherein at least one of the graphical elements is associated with at least one pointer that is associated with and identifies at least a portion of the electronic information, wherein each pointer that is associated with electronic information that is contained within a respective collection of electronic documents identifies the electronic information according to the predetermined indexing pattern of the respective collection;
    selecting at least one graphical element to thereby access at least one associated pointer and thereafter select at least one accessed associated pointer to thereby select at least a portion of the electronic information;
    locating the selected portion of the electronic information based upon the selected at least one pointer and, for the electronic information contained within a respective collection of electronic documents, further based upon the predetermined indexing pattern of the respective collection; and
    retrieving the selected portion of electronic information to thereby access the selected portion of electronic information.

2. A method according to claim 1, wherein at least one of the graphical elements is associated with at least one element electronic document that includes the at least one pointer, and wherein selecting at least one graphical element comprises selecting the at least one graphical element to thereby access an associated at least one element electronic document and thereafter select at least one associated pointer on the selected at least one element electronic document to thereby select at least a portion of the electronic information.

3. A method according to claim 1, wherein at least one of the portal documents comprises at least one schematic diagram of at least one operational system including a plurality of graphical elements representing operational elements of the at least one operational system, and wherein at least a portion of the electronic information is related to respective operational elements of the at least one operational system.

4. A method according to claim 1, wherein the at least one graphical element includes at least one model graphical element, wherein selecting at least one graphical element comprises selecting at least one model graphical element, and wherein the method further comprises modifying at least one graphical element on the selected portal document based upon the portion of electronic information that is selected.

5. A method according to claim 4 wherein the at least one portal document further comprises at least one simulation element, wherein selecting at least one graphical element comprises selecting a respective simulation element of the selected portal document and thereafter selecting at least one graphical element, the method further comprising:
    displaying at least one electronic simulation document associated with the selected portion of electronic information, wherein the at least one simulation document comprises at least one simulation graphical element associated with at least one graphical element on the selected portal document; and
    selecting the at least one simulation graphical element, and
    wherein modifying comprises modifying at least one graphical element on the selected portal document based upon the at least one simulation graphical element that is selected.

6. A method according to claim 5, wherein the at least one portal document comprises at least one schematic diagram of at least one operational system including a plurality of graphical elements representing operational elements of the at least one operational system, wherein the at least one simulation document represents at least one control subsystem of the at least one operational system and includes at least one simulation graphical element associated with at least one graphical element of the at least one portal document, and wherein modifying comprises modifying the at least one graphical element based upon the at least one simulation graphical element that is selected to thereby simulate an operation of at least one of the operational elements of the at least one operational system.

7. A method according to claim 1, wherein selecting at least one portal document comprises selecting at least one portal document from a first location, and wherein retrieving the selected portion of electronic information comprises retrieving the selected portion of electronic information via a wide area network (WAN) when the selected portion of electronic information is located remote from the first location.

8. A system for accessing electronic information, wherein at least a portion of the electronic information is contained within at least one collection of electronic documents indexed according to at least one predetermined indexing pattern, said system comprising:
    at least one electronic database capable of storing the electronic information, wherein the portion of electronic information that is the contained within a respective collection of electronic documents is stored according to the predetermined indexing pattern of the respective collection;

a graphical user interface (GUI) for displaying at least one electronic portal document comprising a plurality of graphical elements, wherein at least one of the graphical elements is associated with at least one pointer that is associated with and identifies at least a portion of the electronic information, wherein each pointer that is associated with electronic information that is contained within a respective collection of electronic documents identifies the electronic information according to the predetermined indexing pattern of the respective collection; and a processing element responsive to a selection of at least one graphical element to thereby access and display at least one associated pointer, wherein said processing element is further responsive to a selection of the at least one associated pointer to thereby select at least a portion of the electronic information, wherein said processing element is capable of locating the selected portion of electronic information based upon the selected at least one pointer and, for the selected electronic information contained within a respective collection of electronic documents, further based upon the predetermined indexing pattern of the respective collection, and wherein said processing element is capable of retrieving the selected portion of electronic information to thereby access the selected portion of electronic information.

9. A system according to claim 8, wherein at least one of the associated pointers includes at least one graphical pointer that is associated with and identifies at least a portion of respective electronic information.

10. A system according to claim 8, wherein at least one of the graphical elements is associated with at least one displayable element electronic document that includes the at least one pointer, and wherein said processing element responsive to a selection of at least one graphical element to thereby access and display an associated at least one element electronic document including the at least one pointer.

11. A system according to claim 8, wherein at least one portal document comprises at least one schematic diagram of at least one operational system including a plurality of graphical elements representing operational elements of the at least one operational system, and wherein at least a portion of the electronic information related to respective operational elements of the at least one operational system.

12. A system according to claim 11, wherein the at least one portal document comprises a simulated three-dimensional display of the at least one operational system.

13. A system according to claim 8, wherein the at least one graphical element includes at least one model graphical element, wherein said processing element is responsive to a selection of the at least one model graphical element to thereby select at least a portion of the electronic information, wherein said processing element is further capable of modifying at least one graphical element of the at least one portal document displayed by said GUI based upon the portion of electronic information that is selected, retrieved and accessed.

14. A system according to claim 13, wherein the at least one portal document displayed by the GUI further comprises at least one simulation element, wherein at least a portion of the electronic information is associated with at least one simulation document comprising at least one simulation graphical element associated with at least one graphical element on the at least one portal document, wherein said processing element is responsive to a selection of the at least one simulation element and thereafter a selection of at least one graphical element to further display an associated simulation document on said GUI, and wherein said processing element is further responsive to a selection of at least one simulation graphical element on the at least one simulation document that is displayed to thereby modify at least one graphical element on the at least one portal document based upon the at least one simulation graphical element that is selected.

15. A system according to claim 14, wherein the at least one portal document comprises at least one schematic diagram of at least one operational system including a plurality of graphical elements representing operational elements of the at least one operational system, wherein the at least one simulation document represents at least one control subsystem of the at least one operational system, and wherein said processing element is capable of modifying the at least one graphical element based upon the at least one simulation graphical element that is selected to thereby simulate an operation of at least one operational elements of the at least one operational system for display upon the GUI.

16. A system according to claim 8, wherein said processing element is located at a first location, and wherein said processing element is capable of retrieving the selected portion of electronic information via a wide area network (WAN) when said at least one database is located remote from the first location.

17. A computer program product for accessing electronic information, wherein at least a portion of the electronic information is contained within at least one collection of electronic documents indexed according to at least one predetermined indexing pattern, the computer program product comprising a computer-readable storage medium having computer-readable program code embodied in said medium, the computer-readable program code comprising:

a first executable portion for selecting at least one electronic portal document comprising a plurality of graphical elements, wherein at least one of the graphical elements is associated with at least one pointer that is associated with and identifies at least a portion of the electronic information, wherein each pointer that is associated with electronic information that is contained within a respective collection of electronic documents identifies the electronic information according to the predetermined indexing pattern of the respective collection;

a second executable portion for selecting at least one graphical element to thereby access at least one associated pointer to thereby select at least a portion of the electronic information;

a third executable portion for locating the selected portion of electronic information based upon the selected at least one pointer and, for the electronic information contained within a respective collection of electronic documents, further based upon the predetermined indexing pattern of the respective collection; and a fourth executable portion for retrieving the selected portion of electronic information to thereby access the selected portion of electronic information.

18. A computer program product according to claim 17, wherein said second executable portion accesses at least one associated pointer that includes at least one graphical pointer that is associated with and identifies at least a portion of respective electronic information.

19. A computer program product according to claim 17, wherein at least one of the graphical elements is associated with at least one element electronic document that includes the at least one pointer, and wherein said second executable selects at least one graphical element to thereby access an associated at least one element electronic document and thereafter select the at least one associated pointer on the selected at least one element electronic document.

20. A computer program product according to claim 19, wherein at least one of the at least one portal documents comprises at least one schematic diagram of at least one operational system including a plurality of graphical elements representing operational elements of the at least one operational system, and wherein at least a portion of the electronic information is related to respective operational elements of the at least one operational.

21. A computer program product according to claim 20, wherein at least one of the at least one portal documents comprises a simulated three-dimensional display of the operational system.

22. A computer program product according to claim 19, wherein the at least one graphical element includes at least one model graphical element, wherein said second executable portion selects a respective model graphical element of the selected portal document, said computer program product further comprising a fifth executable portion for modifying at least one graphical element on the selected portal document based upon the portion of electronic information that is selected.

23. A computer program product according to claim 22, wherein the at least one portal document further comprises at least one simulation element, wherein said second executable portion selects a respective simulation element of the selected portal document and thereafter selects at least one graphical element, said computer program product further comprising:
   a sixth executable portion for displaying at least one electronic simulation document associated with the selected portion of electronic information, wherein the at least one simulation document comprises at least one simulation graphical element associated with at least one graphical element on the selected portal document; and
   a seventh executable portion for selecting at least one simulation graphical element on the at least one simulation document that is displayed, and
   wherein said fifth executable portion modifies the at least one graphical element on the selected portal document based upon the at least one simulation graphical element that is selected.

24. A computer program product according to claim 23, wherein the at least one portal document comprises at least one schematic diagram of at least one operational system including a plurality of graphical elements representing operational elements of the system, wherein the at least one simulation document represents at least one control subsystem of the at least one operational system and includes at least one simulation graphical element associated with at least one graphical element of the selected portal document, and wherein said seventh executable portion simulates an operation of at least one of the operational elements of the at least one operational system based upon the at least one simulation graphical element that is selected.

25. A computer program product according to claim 22, wherein said first executable portion selects at least one portal document from a first location, and wherein said fourth executable portion retrieves the selected portion of electronic information via a wide area network (WAN) when the selected portion of electronic information is located remote from the first location.

26. A method of accessing electronic aircraft information, wherein at least a portion of the electronic aircraft information is contained within at least one collection of electronic documents indexed according to at least one predetermined indexing pattern, said method comprising:
   selecting at least one operational system document comprising a plurality of graphical line replaceable units (LRUs), wherein at least one of the graphical LRUs is associated with at least one hyperlink that is associated with and identifies at least a portion of the electronic aircraft information, wherein each hyperlink that is associated with electronic aircraft information that is contained within a respective collection of electronic documents identifies the electronic information according to the predetermined indexing pattern of the respective collection;
   selecting at least one graphical LRU to thereby access at least one associated hyperlink and thereafter select at least one accessed associated hyperlink to thereby select at least a portion of the electronic aircraft information;
   locating the selected portion of the electronic aircraft information based upon the selected at least one hyperlink and, for the electronic aircraft information contained within a respective collection of electronic documents, further based upon the predetermined indexing pattern of the respective collection; and
   retrieving the selected portion of electronic aircraft information to thereby access the selected portion of electronic aircraft information.

27. A method according to claim 26, wherein at least one of the graphical LRUs is associated with at least one LRU data navigator document that includes the at least one hyperlink, and wherein selecting at least one graphical LRU comprises selecting the at least one graphical LRU to thereby access an associated at least one LRU data navigator document and thereafter select at least one associated hyperlink on the selected at least one LRU data navigator document to thereby select at least a portion of the electronic aircraft information.

28. A method according to claim 26, wherein the at least one graphical LRU includes at least one simulation element, wherein selecting at least one graphical LRU comprises selecting at least one simulation element, and wherein the method further comprises modifying at least one graphical LRU on the selected operational system document based upon the portion of electronic aircraft information that is selected.

29. A method according to claim 28, wherein selecting at least one graphical LRU comprises selecting a respective simulation element of the selected operational system document and thereafter selecting at least one graphical LRU, the method further comprising:
   displaying at least one control panel document associated with the selected portion of electronic aircraft information, wherein the at least one control panel document comprises at least one simulation graphical control associated with at least one graphical LRU on the selected portal document; and
   selecting the at least one simulation graphical control, and wherein modifying comprises modifying at least one graphical LRU on the selected operational system document based upon the at least one simulation graphical control that is selected.

30. A method according to claim 26, wherein selecting at least one operational system document comprises selecting at least one operational system document from a first location, and wherein retrieving the selected portion of electronic aircraft information comprises retrieving the selected portion of electronic aircraft information via the Internet when the selected portion of electronic aircraft information is located remote from the first location.

31. An aircraft maintenance aid system for accessing electronic aircraft information, wherein at least a portion of the electronic aircraft information is contained within at least one collection of electronic documents indexed according to at least one predetermined indexing pattern, said system comprising:

at least one electronic database capable of storing the electronic aircraft information, wherein the portion of electronic aircraft information that is the contained within a respective collection of electronic documents is stored according to the predetermined indexing pattern of the respective collection;

a graphical user interface (GUI) for displaying at least one electronic operational system document comprising a plurality of graphical line replaceable units (LRUs), wherein at least one of the graphical LRUs is associated with at least one hyperlink that is associated with and identifies at least a portion of the electronic aircraft information, wherein each hyperlink that is associated with electronic aircraft information that is contained within a respective collection of electronic documents identifies the electronic aircraft information according to the predetermined indexing pattern of the respective collection; and a processing element responsive to a selection of at least one graphical LRU to thereby access and display at least one associated hyperlink, wherein said processing element is further responsive to a selection of the at least one associated hyperlink to thereby select at least a portion of the electronic aircraft information, wherein said processing element is capable of locating the selected portion of electronic aircraft information based upon the selected at least one hyperlink and, for the selected electronic aircraft information contained within a respective collection of electronic documents, further based upon the predetermined indexing pattern of the respective collection, and wherein said processing element is capable of retrieving the selected portion of electronic aircraft information to thereby access the selected portion of electronic aircraft information.

32. A system according to claim 31, wherein at least one of the graphical LRUs is associated with at least one displayable LRU data navigator document that includes the at least one hyperlink, and wherein said processing element responsive to a selection of at least one graphical LRU to thereby access and display an associated at least one LRU data navigator document including the at least one hyperlink.

33. A system according to claim 31, wherein the at least one graphical element includes at least one model graphical LRU, wherein said processing element is responsive to a selection of the at least one model graphical LRU to thereby select at least a portion of the electronic aircraft information, wherein said processing element is further capable of modifying at least one graphical LRU of the at least one operational system document displayed by said GUI based upon the portion of electronic aircraft information that is selected, retrieved and accessed.

34. A system according to claim 33, wherein the at least one portal document displayed by the GUI further comprises at least one simulation element, wherein at least a portion of the electronic aircraft information is associated with at least one control panel document comprising at least one simulation graphical control associated with at least one graphical LRU on the at least one operational system document, wherein said processing element is responsive to a selection of the at least one simulation element and thereafter a selection of at least one graphical LRU to further display an associated control panel document on said GUI, and wherein said processing element is further responsive to a selection of at least one simulation graphical control on the at least one control panel document that is displayed to thereby modify at least one graphical LRU on the at least one operational system document based upon the at least one simulation graphical control that is selected.

35. A system according to claim 31, wherein said processing element is located at a first location, and wherein said processing element is capable of retrieving the selected portion of electronic aircraft information via the Internet when said at least one database is located remote from the first location.

* * * * *

UNITED STATES PATENT AND TRADEMARK OFFICE
CERTIFICATE OF CORRECTION

| | | |
|---|---|---|
| PATENT NO. | : 7,069,261 B2 | Page 1 of 1 |
| APPLICATION NO. | : 10/114355 | |
| DATED | : June 27, 2006 | |
| INVENTOR(S) | : Ahl et al. | |

It is certified that error appears in the above-identified patent and that said Letters Patent is hereby corrected as shown below:

Column 16,
Line 23, "GUL" should read --GUI--.

Signed and Sealed this

Fifth Day of December, 2006

JON W. DUDAS
*Director of the United States Patent and Trademark Office*